J. V. CUNNINGHAM.
COTTON CHOPPER OR BLOCKER.
APPLICATION FILED FEB. 26, 1917.
1,243,046.
Patented Oct. 16, 1917.
2 SHEETS—SHEET 1.
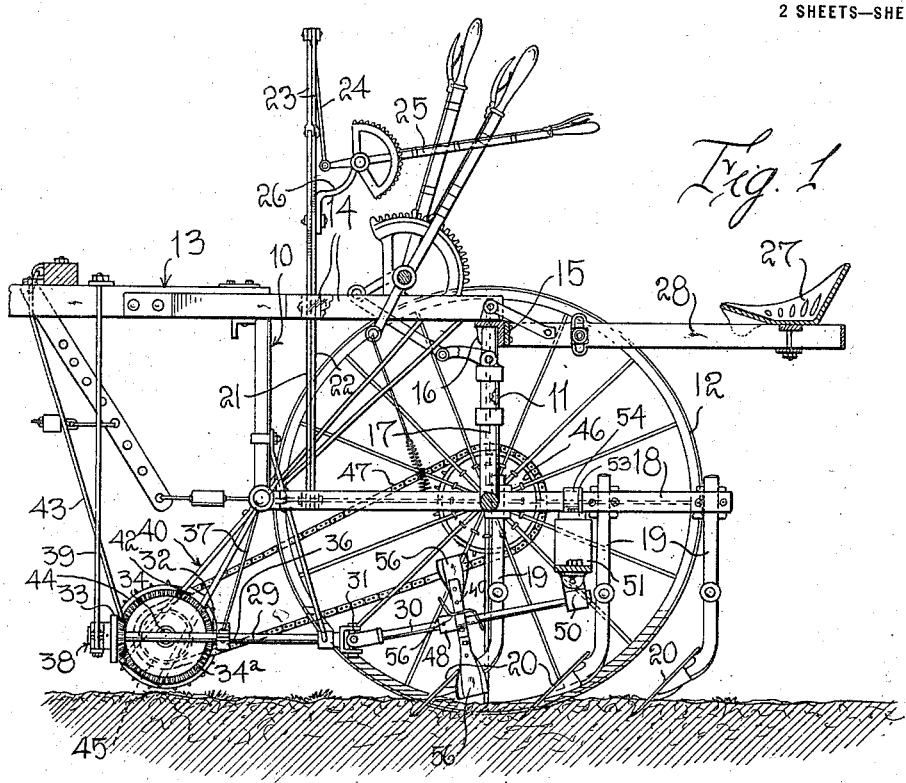
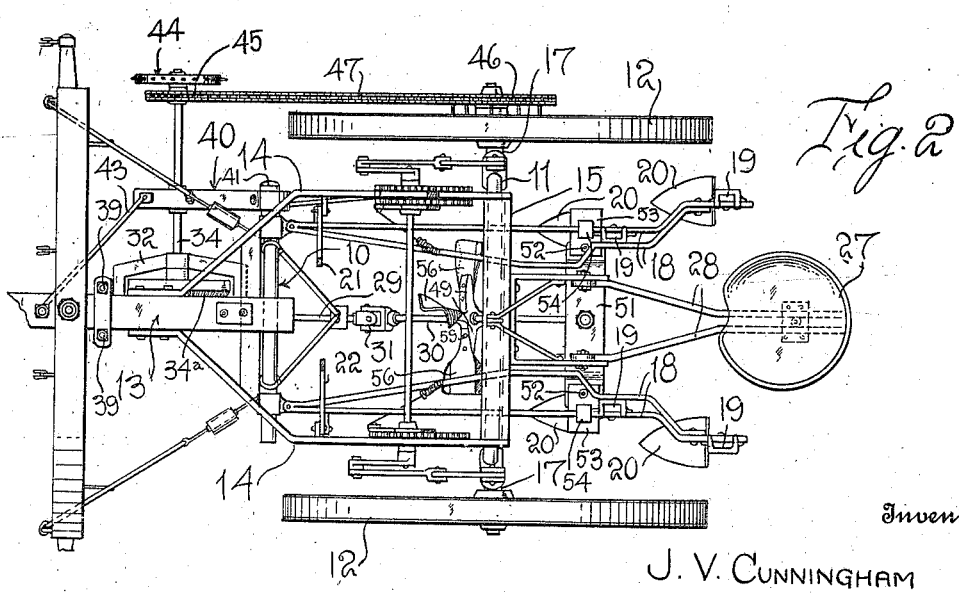
Inventor
J. V. CUNNINGHAM
By Watson E Coleman
Attorney

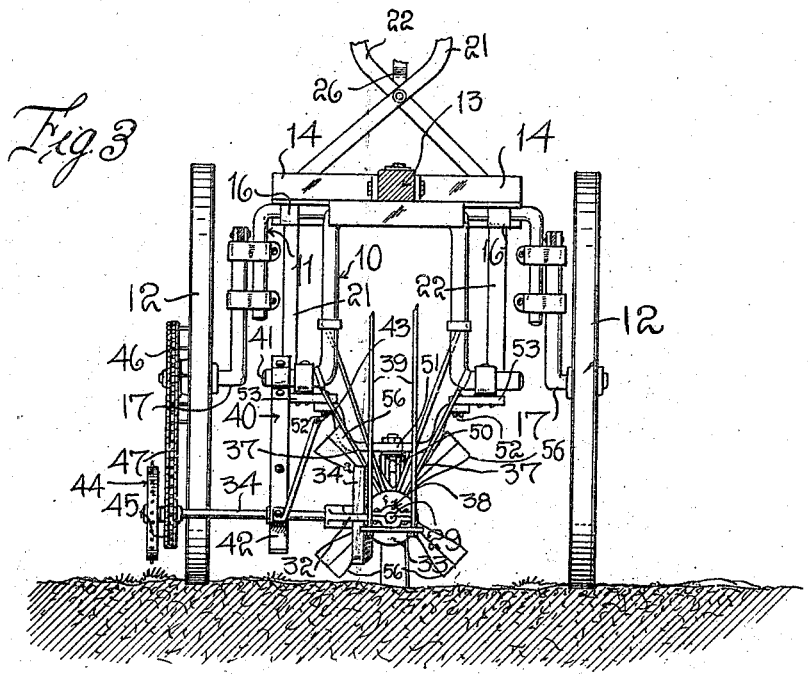
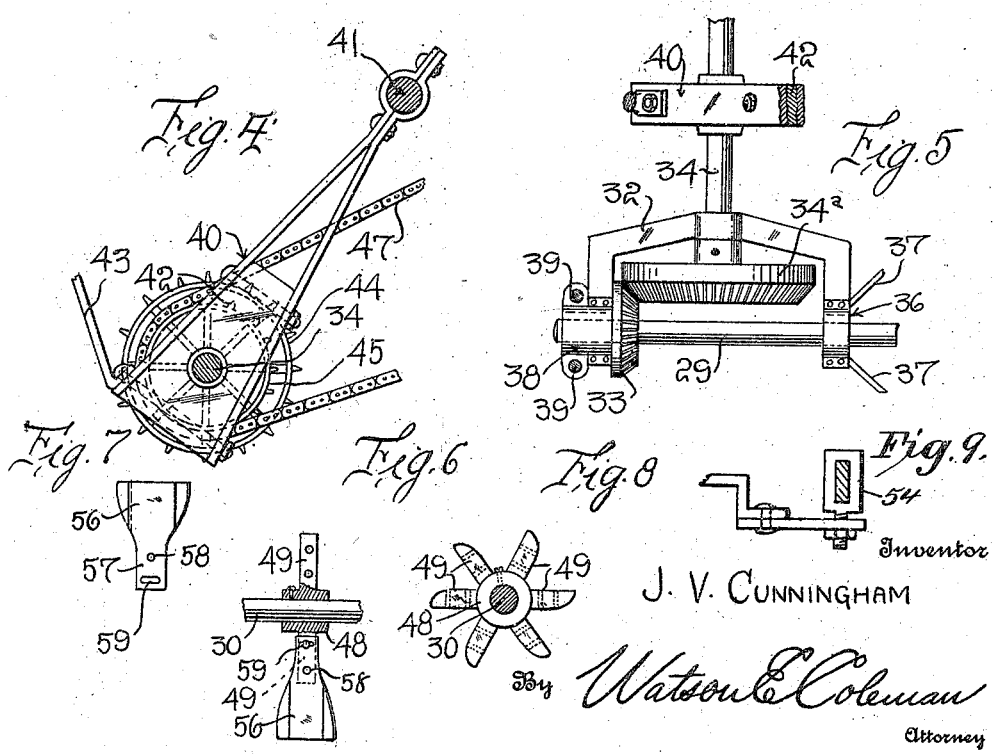

UNITED STATES PATENT OFFICE.

JASPER V. CUNNINGHAM, OF WALNUT SPRINGS, TEXAS.

COTTON CHOPPER OR BLOCKER.

1,243,046.      Specification of Letters Patent.      Patented Oct. 16, 1917.

Application filed February 26, 1917. Serial No. 151,054.

*To all whom it may concern:*

Be it known that JASPER V. CUNNINGHAM, a citizen of the United States, residing at Walnut Springs, in the county of Bosque and State of Texas, has invented certain new and useful Improvements in Cotton Choppers or Blockers, of which the following is a specification, reference being had to the accompanying drawings.

This invention relates to agricultural implements, and particularly to cotton choppers, or devices of like nature.

The general object of the invention is the provision of a combined cotton chopper and cultivator and a further object is to provide a cotton chopper including a longitudinally disposed shaft carrying chopping blades, a wheeled carriage or frame supporting the frame, and means operated by the traction wheels of the machine for rotating the shaft and the chopping blades.

A further object is to provide improved means for supporting the shaft and its driving gears in connection with a cultivator, and to provide means whereby the rear end of the shaft may be pivotally supported from the plow beams upon the cultivator and yet permit these plow beams to be laterally adjusted toward or from each other.

Other objects will appear in the course of the following description.

My invention is illustrated in the accompanying drawings, wherein:

Figure 1 is a longitudinal sectional view of a combined cultivator and cotton chopper, in accordance with my invention;

Fig. 2 is a top plan view;

Fig. 3 is a front elevation, the tongue being in section;

Fig. 4 is a detailed elevation of the means for supporting the shaft 34; and

Fig. 5 is a fragmentary plan view looking from below of the yoke 32 and its attached gears.

Fig. 6 is a sectional view of the hub 48, the shaft 30 and the arms 49 being shown in elevation and one of the blades 56 being shown in elevation.

Fig. 7 is a face view of one of the blades.

Fig. 8 is a side elevation of the hub with its stops, the shaft being in section.

Fig. 9 is a fragmentary elevation of a portion of the cross bar 51, one of the links and the beam-engaging collar.

Referring to these drawings, it will be seen that I have illustrated my improved cotton chopper in connection with a cultivator of ordinary form. This cultivator includes a forward arch, designated 10, and a rear arch 11, formed as will be hereafter stated, the rear arch 11 having mounted on its ends the traction wheels 12. The tongue 13 is formed with the rearwardly extending braces 14, which are connected by a transverse member 15, these braces 14 being operatively connected to the forward arch 10, in any suitable manner; and the rear transversely extending braces being formed with sleeves 16, in which the upper ends of the curved axles 17 are disposed and held in any suitable manner. It will be seen that these curved axles 17 and the transversely extending braces 14 together form the rear arch 11.

Operatively supported at their forward ends upon the outwardly extending terminal ends of the forward arch 11, are the plow or shovel supporting beams 18, upon which are mounted the more or less vertically disposed plow standards 19 carrying the cultivator shovels or plows 20. As illustrated, these beams 18 are mounted so that they may be laterally adjusted and to this end, the rear ends of the beams are operatively connected to the levers 21 and 22, which levers cross each other and extend upward in diverging relation and at their upper ends are connected by a pair of toggle links 23, these links being pivoted to each other and connected to a downwardly extending link 24, in turn connected to an operating lever 25, this operating lever being mounted upon a bracket 26 and operating over a rack, in the usual manner. A seat 27 is supported upon the frame bars 28 which are attached to the frame of the machine, in any suitable manner, the controlling lever 25 being disposed adjacent to the seat. Means are also illustrated for raising and lowering the cultivator beams, but inasmuch as this means is one ordinarily used in machines of this type, it is not believed necessary to describe it.

The construction heretofore described forms no part of my invention. The construction is such as is ordinarily found in cultivators and may be varied in many different ways.

The arches heretofore described are adapted to straddle a row of cotton, or other plants, so that the cultivating shovels will operate between the rows, and for the purpose of chopping out the cotton in the row itself, I support beneath the forward arch 10, the longitudinally extending shaft sections 29 and 30, which are engaged with each other by a flexible coupling or knuckle of ordinary construction, designated 31. The shaft section 29 is supported in an approximately U-shaped yoke 32 and mounted on this shaft section is a beveled pinion 33. Extending at right angles to the shaft section 29 is a shaft section 34 whose inner end is supported in the yoke 32 and which carries upon it the relatively large beveled gear wheel 34ª which meshes with the pinion 33. The shaft section 29 is mounted in a bearing 36 on the rear end of the yoke 32, this bearing having a cap and supporting the rear end of this yoke 32 are upwardly and divergently extending straps 37, which are slidably engaged with the vertically extending portions of the forward arch 10 and which are engaged with the yoke by means of the bolts that hold the cap in place on the bearing 36. The forward end of the yoke 32 has a bearing 38 and from this bearing extend upward two supporting rods 39 which extend upward to the tongue 13 and are operatively connected thereto, in any suitable manner. Mounted on one of the outwardly extending terminal ends of the arch 10 is a shaft supporting hanger designated generally 40, having a bearing or boxing at its lower end through which the shaft 34 passes. This hanger consists of two downwardly diverging lengths of strap iron, which embrace the terminal end 41 of the arch 10 and which, at their lower ends, embraces between them the bearing 42 through which the shaft 34 passes. A brace 43 extends downward from the tongue 13 and is attached to the lower end of the hanger 40 in any suitable manner. Mounted upon the shaft 34 are two or more sprocket wheels 44 and 45, these sprocket wheels being of different diameters, and operatively connected to the adjacent sprocket wheel 44 is a sprocket wheel 46 from which a sprocket chain 47 passes over one of the sprocket wheels 44 or 45. The sprocket chain may be shifted from one sprocket wheel to the other so as to change the speed of rotation of the shaft 34 and hence the speed of rotation of the shaft section 29. It is to be understood that the sprocket wheel 46 may either be disposed on the outside of the traction wheel 12 or on the inside thereof, as desired. I do not wish to limit myself to having the sprocket wheel 46 on the outside of the sprocket wheel 12. Neither do I wish to limit myself to any particular means for connecting the sprocket wheel 46 to the wheel 12.

It will now be seen that as the machine travels over the ground rotation will be transmitted to the shaft section 29 and through the universal joint 31 to the shaft section 30. Carried upon this shaft section 30 is a hub 48 having radiating stub arms 49 to which a plurality of cutting blades may be attached, as will later appear. The rear end of the shaft section 30 is supported in a bearing 50 which has swiveled engagement with a cross bar 51. This bar is downwardly bowed at its middle, as illustrated clearly in Fig. 3, and the upward and laterally turned ends of the bar are pivotally connected by vertical pivots 52 to link members 53, pivoted for horizontal movement to collars 54, through which the beams 18 are disposed. This construction permits the beams 18 to be shifted toward or from each other, without raising or lowering the shaft on which the cutting blades are mounted.

There may be as many blades on the hub 48 as desired and the hub may carry either one blade or six, but preferably not more than six. I have illustrated the hub 48 having four stubs 49 extending therefrom, each stub being formed with a pair of perforations 55 for attachment of the blades 56. Each blade, as illustrated in Fig. 7, has an outwardly widened body portion and a shank 57, the shank being formed with a perforation 58 and with a transversely extending slot 59, so that the inclination of the blades may be changed. The body of each blade is twisted, as illustrated in Fig. 2 so that these blades will cut under the ground and cut out the cotton as the blades revolve.

While I have illustrated a construction which I have found, in actual practice, to be extremely efficient for the purpose intended and thoroughly practical in every respect, yet it is obvious that many changes may be made in the details of construction, without departing from the spirit of the invention as defined in the appended claims. I do not wish to be limited therefore to the exact details shown.

Having thus described my invention, what I claim is:

1. In a combined cultivator and cotton chopper, a wheeled supporting frame, cultivator supporting beams mounted upon the frame and extending rearward therefrom and adjustable toward or from each other, a plurality of flexibly coupled shaft sections disposed below the frame, means for supporting the foremost shaft section from the supporting frame, a transverse supporting bar, links pivotally connecting said transverse bar to the cultivator beams and shiftable in horizontal planes, whereby the cultivator beams may be shifted inward without depressing said transverse bar, a bearing mounted upon the transverse bar and supporting the rear end of the rearmost shaft section, radiating cutting blades mounted on the rearmost shaft section, and means operatively engaging the traction wheels of the frame for driving said shaft sections.

2. A cotton chopper of the character described comprising a supporting frame, traction wheels mounted on the frame, supporting beams mounted on the frame and extending rearward therefrom and shiftable toward or from each other, means for laterally adjusting the cultivator supporting beams, a plurality of flexibly coupled shaft sections disposed below the frame, means for supporting the foremost shaft section from the supporting frame, a cross bar disposed between the cultivator beams, links pivotally connected to the ends of the cross bar for movement in a horizontal plane, means swivelly connecting the cultivator beams to the ends of the links, a bearing swiveled to said beam for rotation in a horizontal plane, said bearing supporting the rear end of the rearmost shaft section, cutting blades mounted on the rearmost shaft section, and means operatively driving the shaft sections from the traction wheels.

3. In a machine of the character described, a supporting frame including a forward arch and a rearward arch, traction wheels supported upon the rearward arch, cultivator beams having their forward ends operatively connected to the forward arch, a hanger extending downward and forward from the forward arch at one end thereof, a tongue extending from the frame of the machine, a brace extending from the tongue to said hanger, a transversely extending shaft mounted in the hanger at one end and carrying a sprocket wheel and a beveled gear wheel, a yoke in which the opposite end of the transverse shaft is supported, means operatively supporting the yoke from the tongue of the machine, a rearwardly extending shaft section mounted on the yoke and carrying a beveled pinion meshing with the beveled gear wheel, a second shaft section flexibly coupled to the first shaft section, a bearing for the rear end of the second main shaft section, a cross bar to which the bearing is swiveled, links pivotally connecting the cross bar to the cultivator beams, radiating cutting blades mounted on the second named shaft section, means for laterally shifting the cultivator beams, a sprocket wheel mounted to rotate with one of the traction wheels, and a sprocket chain operatively connecting the sprocket wheel on the traction wheel with the sprocket wheel on the first named shaft.

In testimony whereof I hereunto affix my signature in the presence of two witnesses.

JASPER V. CUNNINGHAM.

Witnesses:
T. E. ROBBINS,
B. F. CUNNINGHAM.

Copies of this patent may be obtained for five cents each, by addressing the "Commissioner of Patents, Washington, D. C."